United States Patent [19]
Ditzig

[11] Patent Number: 5,507,446
[45] Date of Patent: Apr. 16, 1996

[54] PHONE CORD REWINDER

[75] Inventor: Albert F. Ditzig, Hoffman Estates, Ill.

[73] Assignee: AL-RO, Inc., Hoffman Estates, Ill.

[21] Appl. No.: 106,239

[22] Filed: Aug. 12, 1993

[51] Int. Cl.⁶ .............................. B65H 75/36; H04M 1/15
[52] U.S. Cl. .......................... 242/372; 242/47.5; 242/376; 379/438
[58] Field of Search ..................... 242/47.5, 371, 242/372, 373, 376, 378; 191/12 R; 379/433, 437, 438, 440, 454, 455, 457

[56] References Cited

U.S. PATENT DOCUMENTS

| | | | |
|---|---|---|---|
| 1,384,153 | 7/1921 | Roos | 242/47.5 |
| 1,557,033 | 10/1925 | Davis | 242/47.5 |
| 1,635,850 | 7/1927 | Kubista | 242/47.5 |
| 1,936,463 | 11/1933 | Strang | 242/47.5 |
| 2,014,329 | 9/1935 | Hellman | 242/47.5 |
| 2,016,935 | 10/1935 | Strang et al. | 242/47.5 |
| 2,503,018 | 4/1950 | Wittman | 242/47.5 |
| 2,609,191 | 9/1952 | Foster . | |
| 2,647,743 | 8/1953 | Cook . | |
| 4,691,806 | 9/1987 | Jansen et al. | 242/47.5 |
| 4,727,569 | 2/1988 | Kutrieb et al. | 379/438 X |
| 4,940,859 | 7/1990 | Peterson . | |
| 4,946,010 | 8/1990 | DiBono . | |
| 4,984,269 | 1/1991 | Holzhauer et al. | 379/438 X |
| 5,050,813 | 9/1991 | Ishikawa et al. . | |
| 5,094,396 | 3/1992 | Burke . | |
| 5,114,091 | 5/1992 | Peterson et al. . | |
| 5,128,993 | 7/1992 | Skowronski | 379/437 X |
| 5,153,969 | 10/1992 | Arrendiell et al. . | |
| 5,156,242 | 10/1992 | Ditzig . | |

FOREIGN PATENT DOCUMENTS

442556  2/1936  United Kingdom ................. 242/47.5

Primary Examiner—John M. Jillions
Attorney, Agent, or Firm—Charles F. Meroni, Jr.

[57] ABSTRACT

According to the invention there is provided a cord rewinder which includes two sets of multiple pulleys, each set being seated at an opposite end of an elongate housing. One set is fixed in place while the other set is biased toward its corresponding end of the housing. When a pull is applied to a cord helically wound around the pulleys and extending along the length of the housing between the pulleys, the biased pulley set moves toward the fixed pulley set releasing the cord. When the pull is removed, the biased pulley set moves back to its end position retracting the cord.

21 Claims, 7 Drawing Sheets

PHONE CORD REWINDER

BACKGROUND OF THE INVENTION

1. Field of the Invention

The present invention relates to a phone for use in an airplane or motor vehicle and a cord rewinder for same.

2. Description of the Prior Art

Heretofore various telephone receivers and cord rewinders for same have been proposed.

Examples of such devices may be found in the following U.S. Patents:

| U.S. Pat. No. | Inventor(s) |
| --- | --- |
| 4,727,569 | Kutrieb et al. |
| 4,940,859 | Peterson |
| 4,946,010 | DiBono |
| 5,050,813 | Ishikawa et al. |
| 5,094,396 | Burke |
| 5,114,091 | Peterson et al. |
| 5,153,969 | Arrendiell et al. |
| 5,156,242 | Ditzig |

U.S. Pat. No. 4,727,569 of Kutrieb et al. relates to a Hardwire Airplane Telephone Apparatus which is mounted on an airplane food and beverage tray. A reel is mounted in the tray and is resiliently retained in a datum position such that the telephone cord connected to the handset is tightly wound and the second telephone cord is connected in the reel to the first cord and is loosely wound.

U.S. Pat. No. 4,940,859 of Peterson discloses a Telephone Cord Take-Up Reel Assembly which provides for a predetermined length of cord to be automatically reeled into the take-up reel housing. A metal reel spring shaped in the form of a coil is used to reel the cord into the housing.

U.S. Pat. No. 4,946,010 by DiBono relates to a Telephone Cord Retraction Device which utilizes a retractable spool within a housing to permit tension on an extendable cord. This invention also utilizes a spring motor connected to the spool to facilitate one rotational direction.

U.S. Pat. No. 5,050,813 of Ishikawa et al. discloses a further Cord Retaining and Winding Device which uses a spiral shaped elongated body to house and store appliance cords. This Cord Winding Device is designed to permit extension of only a requisite amount of useable cord.

U.S. Pat. No. 5,094,396 of Burke relates to a Retractable Reel Assembly for a Telephone Extension Cord whereby a cord be wound and rewound in a radially and axially confined planar helical array. The retractable reel assembly in this invention also provides for the use of a ratchet for selectively restraining rotation of the reel in one direction.

U.S. Pat. No. 5,114,091 by Peterson et al. discloses a Dual Reel Cord Take-Up Device consisting of a dual reel spool assembly having a pair of axially secured winding hubs separated by a main spool disc. A coil spring is placed between the dual reels of the spool assembly via a spring locking key which radially biases the dual reel spool assembly about its axis to retract any slack in the cord.

U.S. Pat. No. 5,153,969 of Arrendiell et al. relates to a Cord Clasp which is used to hold together loops of an appliance cord. A coil spring is utilized to keep the cord surrounding portions together facilitating the use of several thicknesses of cord.

As will be described in greater detail hereinafter, the rewinder of the present invention includes a constant force spring, which spring is engaged to a sliding reel within the rewinder. Further, when used with an arm rest mounted phone in an airplane or vehicle, the rewinder is proposed to be mounted to the receiver in end to end relation.

SUMMARY OF THE INVENTION

According to the invention there is provided a rewinder for a cord of an armrest mounted telephone comprising a housing adapted to be mounted to a telephone; a first set of pulleys fixedly engaged within the housing at one end thereof; a second set of pulleys movably engaged at an opposite end of the housing; and biasing means engaged to the second set of pulleys for biasing same away from the first set; a cord of the telephone being helically wound to extend between the sets of pulleys with turns of the cord each engaging a separate, opposite pulley.

DESCRIPTION OF THE PREFERRED EMBODIMENT

Figure 1:
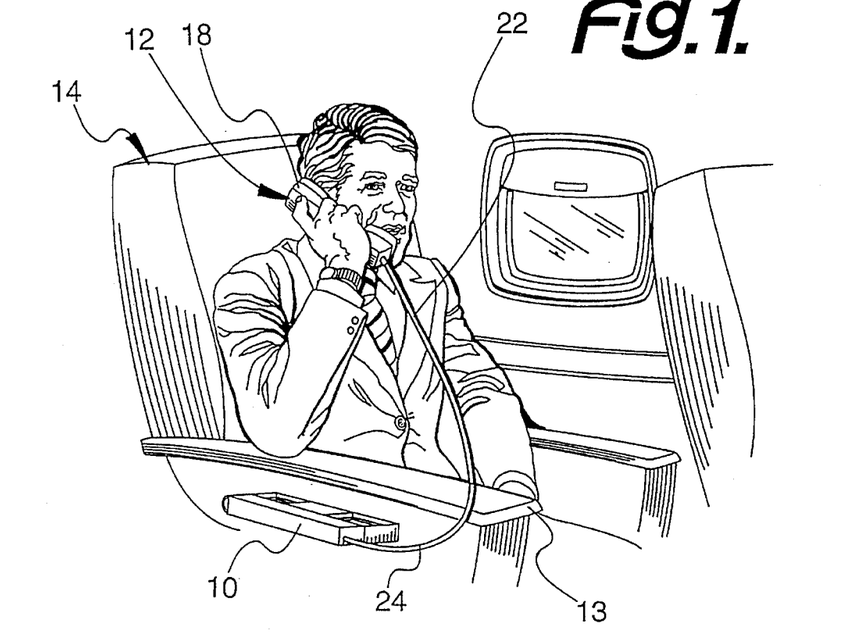
FIG. 1 is a perspective view of an in flight armrest phone incorporating one embodiment the rewinder as disclosed herein shown in use by a passenger.
Figure 2:
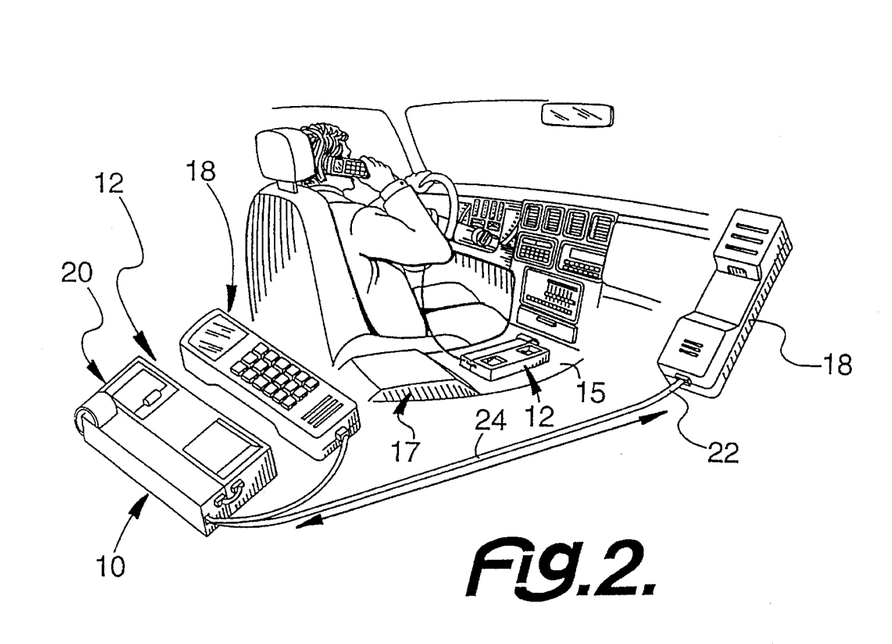
FIG. 2, is a perspective view of a vehicle phone incorporating a further embodiment of the rewinder as disclosed herein.

Referring now to the drawings in greater detail, there is illustrated in the drawings a cord rewinder 10 for an arm rest mounted phone 12. As shown, the phone 12 may be mounted either in the arm rest 13 of an airplane seat 14 or in the arm rest 15 of a vehicle seat 17.

The rewinder 10 may be engaged in end-to-end, in-line relation to the hand set 18 of the phone 12, or may be mounted to a base member 20 of the phone 12 when such base member 20 is presented or may be simply mounted in the armrest 13 or 15.

Figure 3:
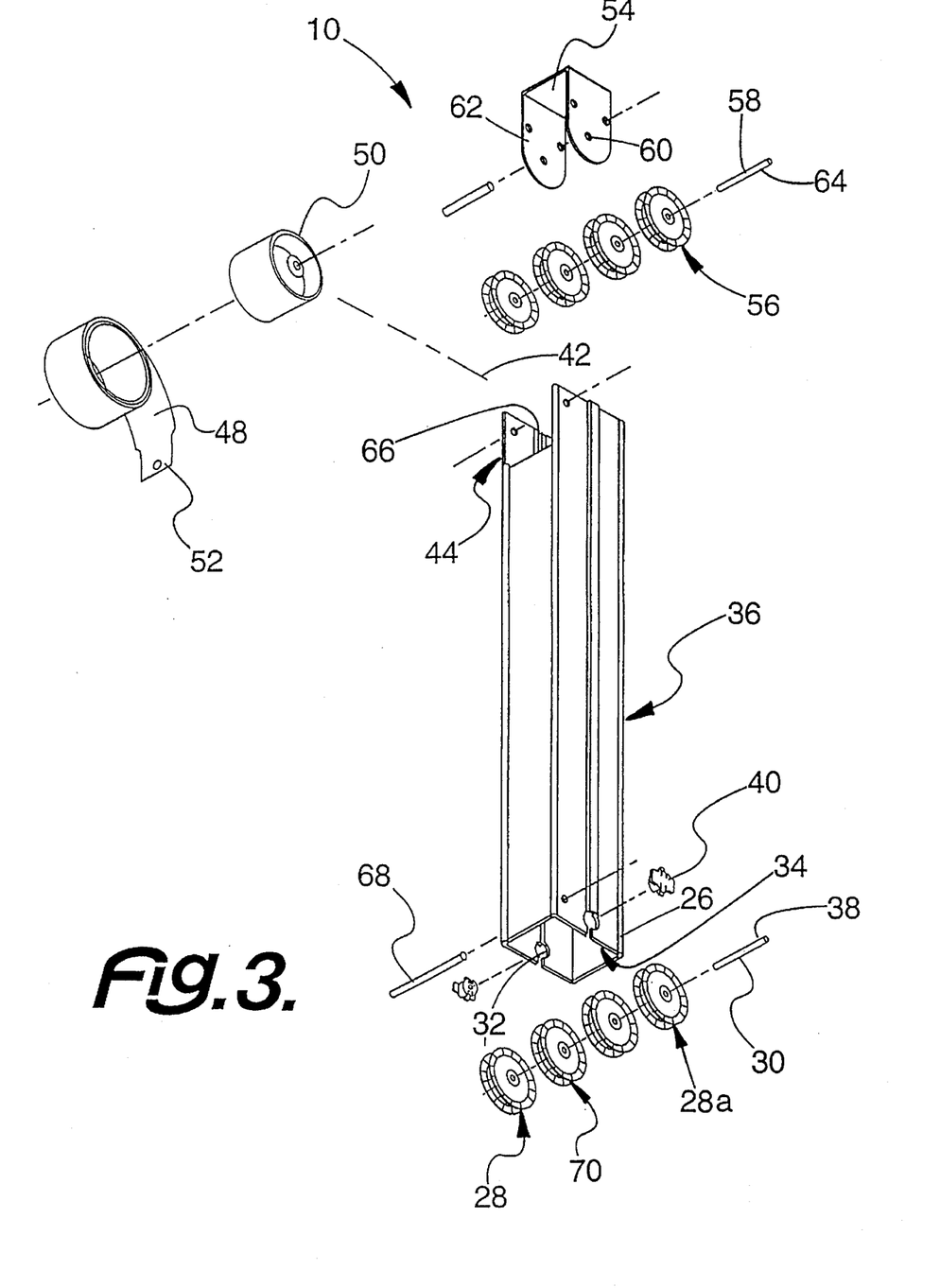
FIG. 3 is an exploded perspective view of one embodiment of the rewinder.
Figure 5:
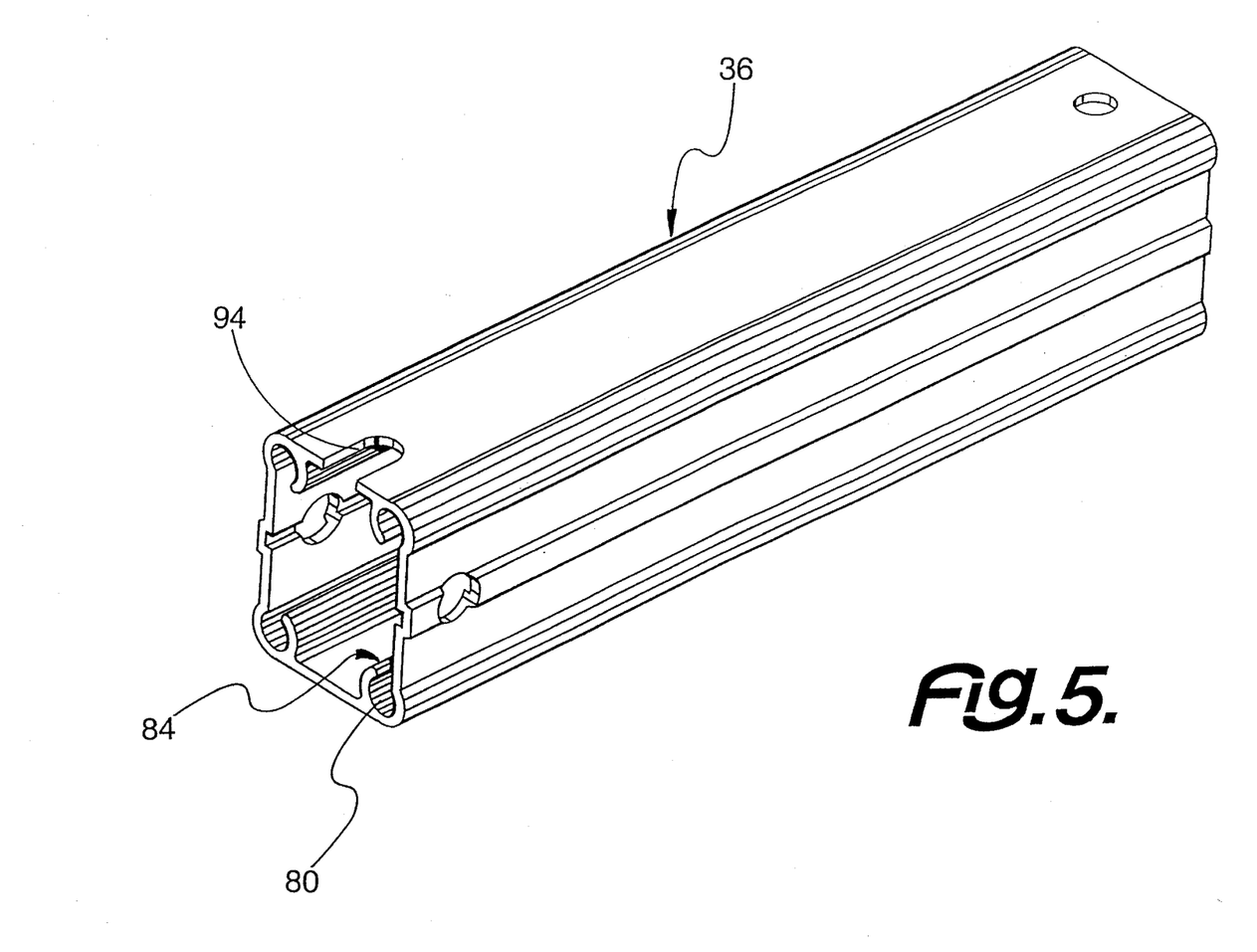
FIG. 5 is an enlarged perspective view of the rewinder housing.
Figure 6:
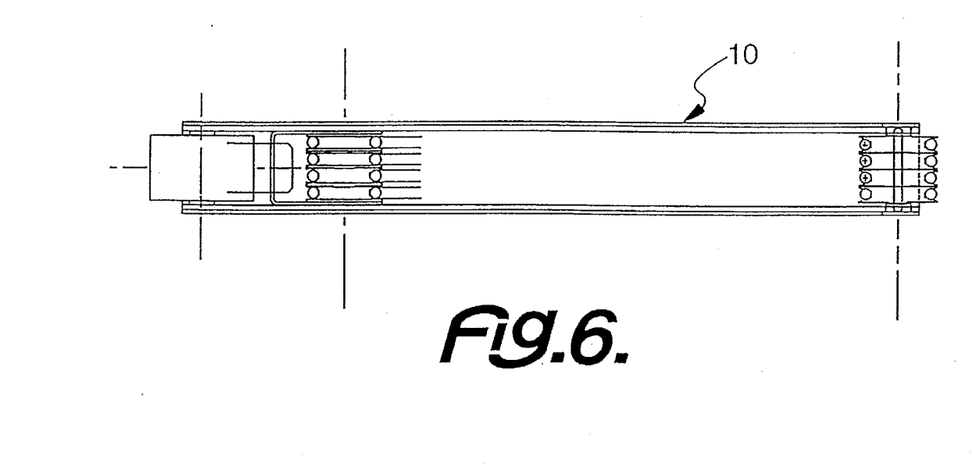
FIG. 6 is a top plan view of the rewinder shown in FIG. 3.
Figure 7:
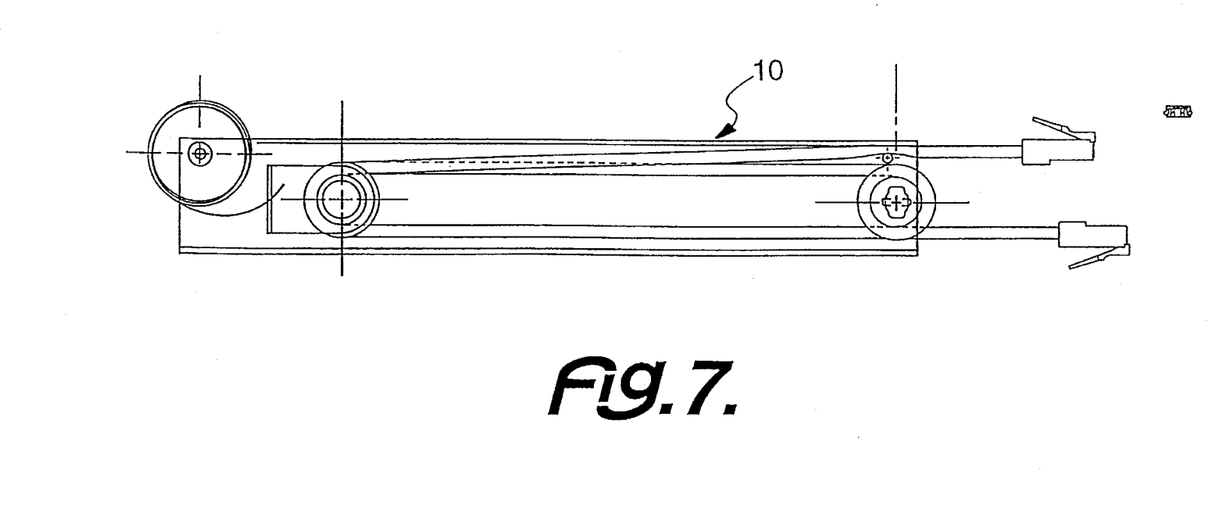
FIG. 7 is a side view of the winder shown in FIG. 6.
Figure 8:
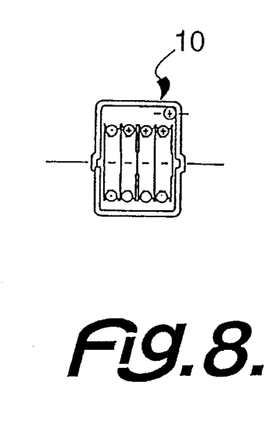
FIG. 8 is an end view of the winder shown in FIG. 7.
Figure 9:
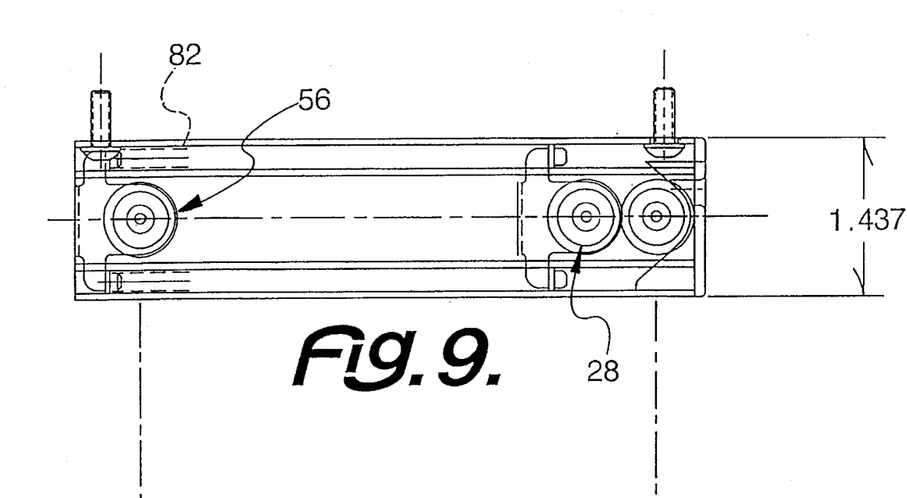
FIG. 9 is a side view of the winder shown in FIG. 4.
Figure 10:
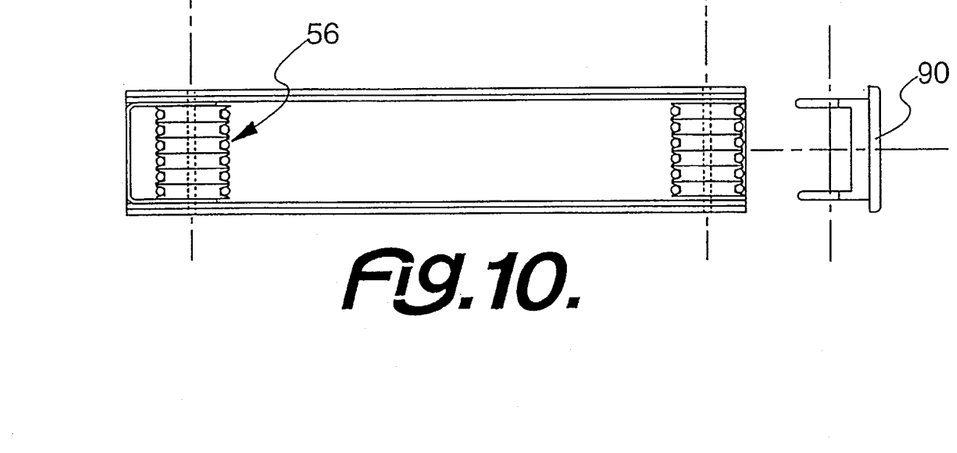
FIG. 10 is a top plan view of the winder shown in FIG. 9.
Figure 11:
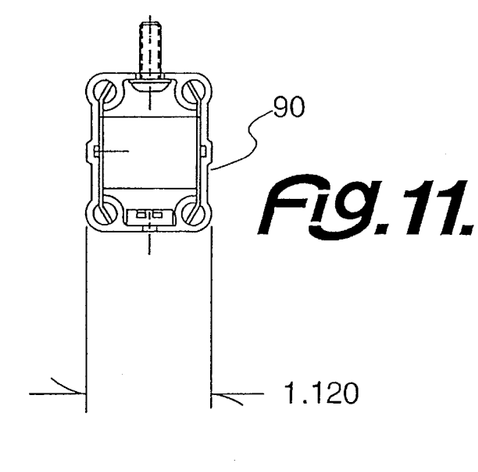
FIG. 11 is an end view of the winder.
Figure 11A:
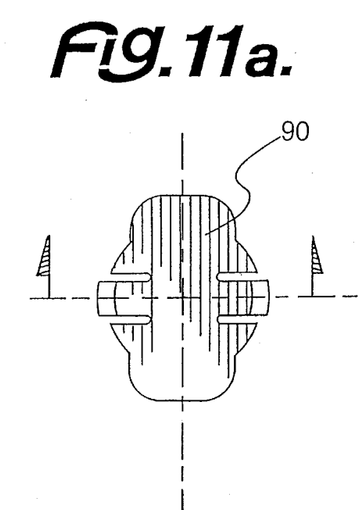
FIG. 11a, b, c and d show various positions of my end cap.
Figure 11B:
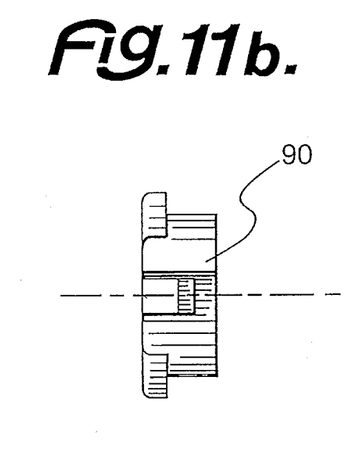
Figure 11C:
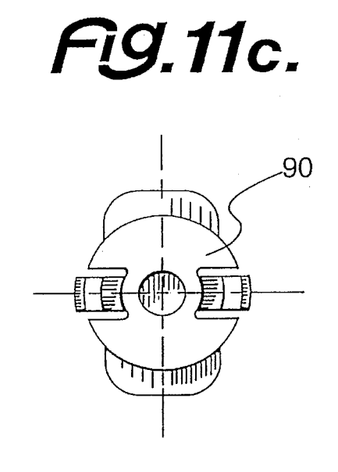
Figure 11D:
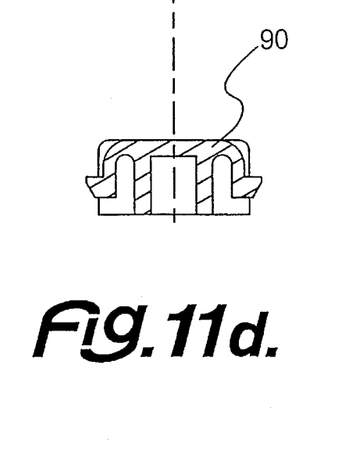

With this type of mounting, to eliminate stress on a fixed end 22 of the wire or cable 24 exiting the handset 18, the rewinder 10 is provided with a first end 26 having a plurality pulleys 28 thereon which rotate about a fixed in place spindle 30 which extends through aligned openings 32 in side walls 34 of a housing 36 of the rewinder 10 and engages at each end 38 a bearing 40 sized and configured to snugly engage in the side wall opening 32.

The bearing 40 extends into the interior of the housing 36 a short distance to keep an outer pulley 28a at each end 38 of the spindle 30 from coming into contact with an inner surface 42 of the side walls 34, minimizing potential friction.

At another end 44 of the housing 36 is fixedly mounted a convolute coiled metal spring 48. The coiled metal spring 48 is engaged merely by its coiled configuration about a spool 50 from which the spring 48 can be uncoiled and recoiled.

When the spring 48 is uncoiled, it extends into the housing 36 in an arcuate configuration, with such configuration extending the useful life of the spring 48. Mounted at a free end 52 of this coiled spring 48 is a bracket or bracket member 54 to which a second plurality of pulleys 56 are mounted via a spindle 58 which engages in openings 60 in opposite side walls 62 of the U shaped bracket 54.

The phone handset wire or cord 24 is threaded in a helical configuration about the pulleys 28 and 56, extending between the ends 22 and 44 of the rewinder 10. Thus, when a pulling action is applied to the handset cord 24, the pulleys 56 mounted to the spring 48 cause the spring 48 to uncoil and move toward the fixed in position pulleys 28. Alternatively, when the pull on the cord 24 is released, the coiled spring 48 returns to its coiled configuration taking the pulleys 56 engaged thereto with it and causing retraction of the cord 24 into the rewinder 10.

Obviously, the amount of cord 24 extension capability offered by the rewinder 10 is determined by the number of pulleys 28 and 56 provided and the beginning distance between the fixed pulleys 28 and the spring mounted pulleys 56.

Further, the number of pulleys 28 and 56 provided will determine the required return force of the spring 48.

In the preferred embodiment, two pairs of four pulleys each are provided, for a total of eight pulleys.

It will further be seen that the ends 64 of the spindle 58 on which spring engaging pulleys 56 are mounted seat within a channel 66 in each side wall 34 of the housing 36 for maintaining the pulleys 56 centered within the housing 36.

Further, a guide pin 68 for each set of pulleys 28 and 56 is provided which serves to keep the cord 24 engaged within a peripheral groove 70 in each of the pulleys 28 and 56.

Figure 4:
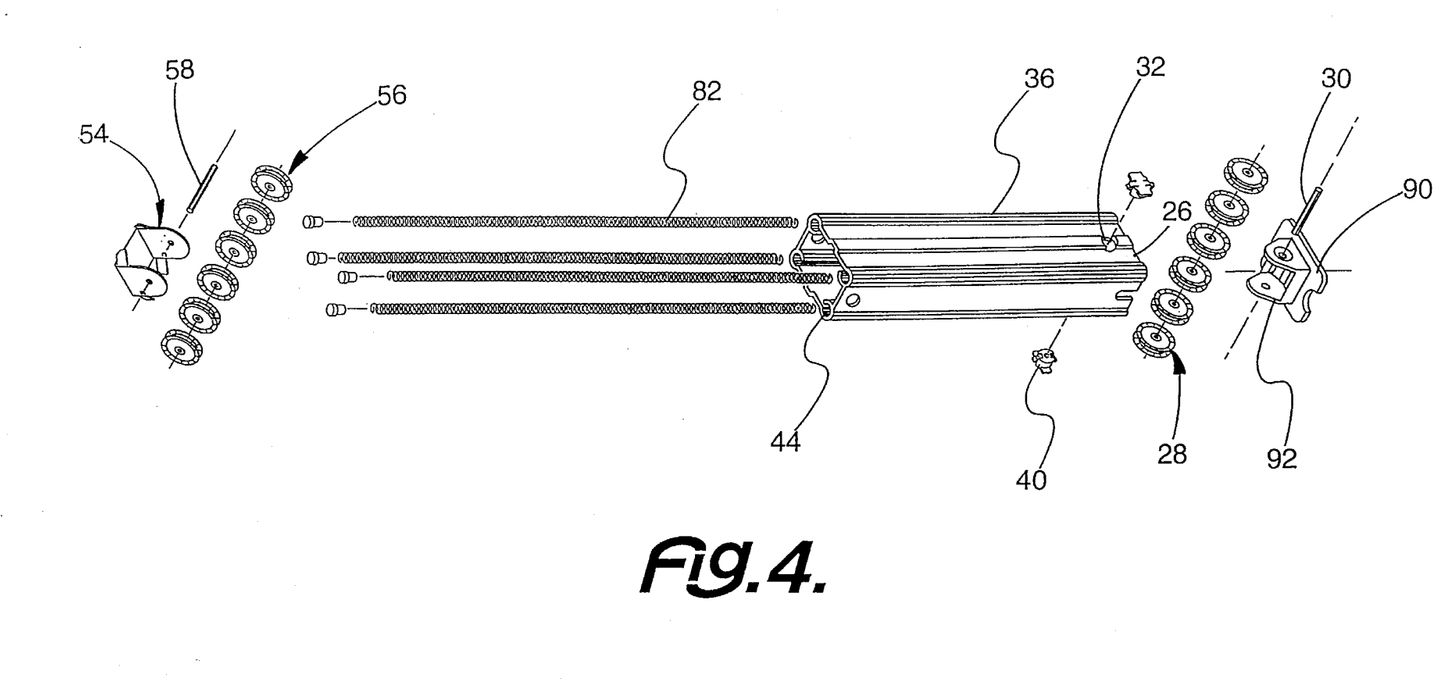
FIG. 4 is an exploded perspective view of a second embodiment of the rewinder.

It will be seen that the rewinder 10 can be modified slightly to accommodate smaller gauge cable or cord 24, such as that proposed for use in the arm rests of an aircraft. Here, to provide more extension, it is proposed in the preferred embodiment shown to provide a dozen or so pulleys 28 and 56.

Provision of a greater number of pulleys 28 and 56 inherently requires a greater return spring force than that which can be provided with the coiled spring 48.

Thus, it is proposed to provide four spring channels or corner channels 80 along the length of the housing 36 within each of which a helical spring 82 is engaged. The corner channels 80 each have a slot 84 therein extending along the length thereof via which a mechanical engagement with the pulley mounting bracket 54 may be formed to bias the bracket 54 toward the end 44 of the housing 36 opposite end 26 at which the fixed in position pulleys 28 are engaged.

Here to maintain the cord 24 within the respective pulleys 28 at the end 26 where the pulleys 28 are fixed in position, an end cap 90 is provided which rests against a circumferential point of each of the pulleys 28 and has two spaced apart flanges 92 which engage about the spindle 38 to maintain the spring.

It will be understood from the drawings that a slot 94 is provided in one of the walls of the housing 36 for ends of the cord 24 to extend through.

This take-up device 10 shown in FIGS. 3, 6, 7 and 8 has a main body which is extruded plastic cut to length and post-machined with drilled holes, either cut out or milled, to accept a return spring. There are also 8 identical pulleys (P.N. 21050) ejection molded of Acetal or Delrin (Dupont Trade Name). The material is a frictionless type with high lubricity. In the construction I have provided a bracket that holds 4 pulleys with a cross bearing pin and guide pins. The cross bearing pin matches the slot in the extrusion which in turn guides the bracket pulley and pulleys as the cord is extracted and retracted, reducing the amount of friction and keeping the pulleys from dragging on the side walls. Also in place is a guide pin that spans the bracket pulley from one edge to the other keeping the cables in the pulley grooves. There is a spool for the spring. A coil metal spring is merely wrapped around the spool and the friction of the spring on the spool retains it on the spool. The end of the spring is attached to a tang on the pulley bracket. The spring relationship to the pulley is such that it produces minimal stress on the constant force spring as the cable is extracted. The ends are not really restrained but are free to float and as the cable is extracted the spring uncoils into a large arc permitting the spring to increase the cycle life. The increase in spring life is significant. There are also 2 bearings on the stationary pulley end. The bearings are there to aid in assembly. The cable can be wrapped around 8 pulleys prior to insertion into the extruded housing for assembly. After insertion, bearings are merely snapped in place, producing 8 lines of cable 24 between pulleys and the cable is extracted the lateral distance of movement of the pulleys 56 producers approximately eight times this distance in extracted cable. The amount of cable displaced by extraction can be increased by adding more pulleys. More pulleys however will increase the width of the device. Also, it will require the return force spring to be increased by the magnitude of the number of pulleys. This pull force on the cable is ⅛ of the force of the spring return force. There is also a pin guide at the stationary end that keeps the cables on the pulleys but also serves as a strain relief for the one end of the cable that is stationary (plugged into the stationary base). This is essentially the entire working device of the mobile phone cord take-up.

The Application for the rewinder device 10 that mounts in the arm rest 13 of an aircraft is basically in principal the same as the other device. This application however requires 12 pulleys which produces 12 lines and therefore more force is needed. This mandates the use of 4 springs, one in each corner to move. The pulleys 56 and the bracket instead of the use of the constant force spring. This unit uses smaller gauge cable. Therefore, more pulleys can be placed in the device and actually extracted to a longer length. All other facets are the same. There are bearings and a guide pin as the other design, however the cables are divided by an end cap. It acts as a cable guide to the pulley preventing it from snagging or entangling.

The advantages of these designs in relation to other take-up devices relies in the fact that there are no electrical contacts. Most devices spin on larger diameters and the cable is wrapped around a big drum, leaving the center of the drum through a series of contacts as the cable is wrapped around a clock spring. This is the construction of a typical take-up device. This new design eliminates contacts and cost which is incurred by the application of the extra contacts, larger drum, wrapped cable and a clock spring. It also lends itself to a neater installation as its length can be the length of a phone or slightly larger and it can be mounted adjacently.

As described above, the rewinder 10 has a number of advantages some of which have been described above and others of which are inherent in the invention. Also, modifications may be proposed without departing from the teachings herein. Accordingly the scope of the invention is only to be limited as necessitated by the accompanying claims.

I claim:

1. A rewinder for a cord of an armrest mounted telephone comprising:

a housing adapted to be mounted to a telephone, the housing having a plurality of spring channels;

a first set of pulleys fixedly engaged within the housing at one end thereof;

a second set of pulleys movably engaged at an opposite end of the housing; and biasing means engaged to said second set of pulleys for biasing same away from said first set, the biasing means having a plurality of helical springs, each helical spring operatively engaging one of the spring channels of the housing;

the sets of pulleys having a telephone cord wound therearound in a helical manner with turns of the cord each engaging a separate, opposite pulley.

2. The rewinder of claim 1 wherein said fixedly engaged first set of pulleys is mounted on a spindle which engages to said housing by means of bearings.

3. The rewinder of claim 2 wherein said movably engaged pulleys are mounted on a spindle, the spindle having two ends each of which extends into a channel provided in a side wall of the housing.

4. The rewinder of claim 3 wherein means are provided for maintaining turns of the cord on the appropriate pulleys to maintain the helical configuration of the cord.

5. The rewinder of claim 4 wherein said spindle of said movably engaged pulleys engages a bracket member.

6. The rewinder of claim 5 wherein said bracket includes means thereon for engaging the biasing spring.

7. The rewinder of claim 6 wherein said spring is mounted external to the housing.

8. The rewinder of claim 6 wherein said spring is mounted internal to the housing.

9. The rewinder of claim 6 wherein said sets of pulleys equal a total of eight pulleys.

10. The rewinder of claim 6 wherein said sets of pulleys equal a total of twelve pulleys.

11. In combination, an armrest mounted telephone assembly including an automobile telephone housing;

an automobile telephone receiver removably mounted on the automobile telephone housing;

a telephone cord rewinder apparatus mounted in side-by-side engaged relation to the automobile telephone housing;

the rewinder apparatus having a rewinder housing mounted alongside of the automobile telephone housing, the rewinding housing having a plurality of spring channels;

a first set of pulleys fixedly engaged within the rewinding housing at one end thereof;

a second set of pulleys movably engaged at an opposite end of the rewinder housing;

biasing means engaged to said second set of pulleys for biasing same away from said first set, the biasing means having a plurality of helical springs, each helical spring operatively engaging one of the spring channels of the rewinding housing; and a telephone cord wound around the sets of pulleys in a helical configuration with turns of the cord each engaging a separate, opposite pulley, the telephone cord being connected between the telephone receiver and the sets of pulleys in said receiver housing.

12. The combination of claim 11 wherein said fixedly engaged first set of pulleys is mounted on a spindle, and bearings securing said spindle to said rewinder housing.

13. The combination of claim 12 wherein said movably engaged pulleys are mounted on said spindle, the spindle having two ends, each of said ends extend into a channel provided in a side wall of the rewinder housing.

14. The combination of claim 13 wherein means are provided for maintaining turns of the cord on the appropriate pulleys to maintain the helical configuration of the cord.

15. The combination of claim 14 wherein said spindle of said movably engaged pulleys engages a bracket member.

16. In an airline armrest telephone assembly including an armrest, the telephone assembly being mounted in the armrest, the improvement of a rewinder for a cord of an armrest mounted telephone assembly mounted in-line with the telephone assembled in the armrest, the rewinder comprising:

a housing adapted to be mounted in-line with a telephone assembly along the length of the airline armrest, the housing having a plurality of spring channels;

a first set of pulleys fixedly engaged within the housing at one end thereof;

a second set of pulleys movably engaged at an opposite end of the housing; and biasing means engaged to said second set of pulleys for biasing same away from said first set, the biasing means having a plurality of helical springs, each helical spring operatively engaging one of the spring channels of the housing;

the sets of pulleys having a telephone cord wound therearound in a helical manner with turns of the cord each engaging a separate, opposite pulley.

17. The rewinder of claim 16 wherein said fixedly engaged first set of pulleys is mounted on a spindle which engages to said housing by means of bearings.

18. The rewinder of claim 17 wherein said movably engaged pulleys are mounted on a spindle, the spindle having two ends each of which extends into a channel provided in a side wall of the housing.

19. The rewinder of claim 18 wherein means are provided for maintaining turns of the cord on the appropriate pulleys to maintain the helical configuration of the cord.

20. The rewinder of claim 19 wherein said spindle of said movably engaged pulleys engages a bracket member.

21. In an airline armrest telephone assembly including an armrest, the telephone assembly being mounted in the armrest, the improvement of a rewinder for a cord of an armrest mounted telephone assembly mounted side-by-side with the telephone assembled in the armrest, the rewinder comprising:

a housing adapted to be mounted alongside a telephone assembly in the airline armrest, the housing having a plurality of spring channels;

a first set of pulleys fixedly engaged within the housing at one end thereof;

a second set of pulleys movably at an opposite end of the housing; and biasing means engaged to said second set of pulleys for biasing same away from said first set, the biasing means having a plurality of helical springs, each helical spring operatively engaging one of the spring channels of the housing;

the sets of pulleys having a telephone cord wound therearound in a helical manner with turns of the cord each engaging a separate, opposite pulley.

* * * * *